United States Patent [19]

Yamamoto

[11] Patent Number: 5,379,236
[45] Date of Patent: Jan. 3, 1995

[54] MOVING OBJECT TRACKING METHOD
[75] Inventor: Makoto Yamamoto, Tokyo, Japan
[73] Assignee: Yozan Inc., Tokyo, Japan
[21] Appl. No.: 885,846
[22] Filed: May 20, 1992
[30] Foreign Application Priority Data
May 23, 1991 [JP] Japan .................................. 3-147832
[51] Int. Cl.[6] ............................................. G06F 15/00
[52] U.S. Cl. ..................................... 364/516; 348/172
[58] Field of Search ............... 364/516, 517, 423, 460; 358/105, 106, 135, 125, 126, 136; 382/16, 25, 111; 235/411

[56] References Cited

U.S. PATENT DOCUMENTS

| | | | |
|---|---|---|---|
| 4,115,803 | 9/1978 | Morton | 358/107 |
| 4,626,908 | 12/1986 | Tani | 358/125 X |
| 5,040,230 | 8/1991 | Takatori et al. | 382/15 |
| 5,164,910 | 11/1992 | Lawson et al. | 364/516 |

Primary Examiner—Jack B. Harvey
Assistant Examiner—Kamini S. Shah
Attorney, Agent, or Firm—Cushman, Darby & Cushman

[57] ABSTRACT

A moving object tracking method for determining whether a moving object has come to a standstill and whether the moving object is moving irregularly without defining a background image. Images of a predetermined area are input sequentially. As the images are input, an object moving within the predetermined area is extracted based on the differences between the images. A representative point of each such moving object is calculated for each new image, and the expected range of movement of the representative point is determined. The moving object is found to be moving regularly when the representative point remains within the expected range.

4 Claims, 3 Drawing Sheets

MOVING OBJECT TRACKING METHOD

BACKGROUND OF THE INVENTION

1. Field of the Invention

The present invention relates to a method for detecting that a moving object is in irregular motion within a group of moving objects performing regular motion.

2. Description of the Art

In many cases, the unusual motion of a moving object in a group of moving objects is found by extracting the change of the image of the object at different times. However, it cannot be determined if the object comes to a standstill by using this method. Conventionally, therefore, whether a moving object comes to a standstill and whether it keeps regular motion is determined with reference to the background image. However, the background image itself may change (for example, due to changing shadows) and this method therefore does not always track objects correctly.

SUMMARY OF THE INVENTION

The present invention is invented so as to solve the above problems of the prior art and to provide a method for determining if a moving object comes to a standstill and if it keeps regular motion, without defining the background image. The moving object tracking method of the present invention tracks the representative point of an object moving in a predetermined area.

PREFERRED EMBODIMENT OF THE PRESENT INVENTION

Hereinafter, an embodiment of the moving object tracking method of the present invention is described with reference to the attached drawings.

Figure 1:
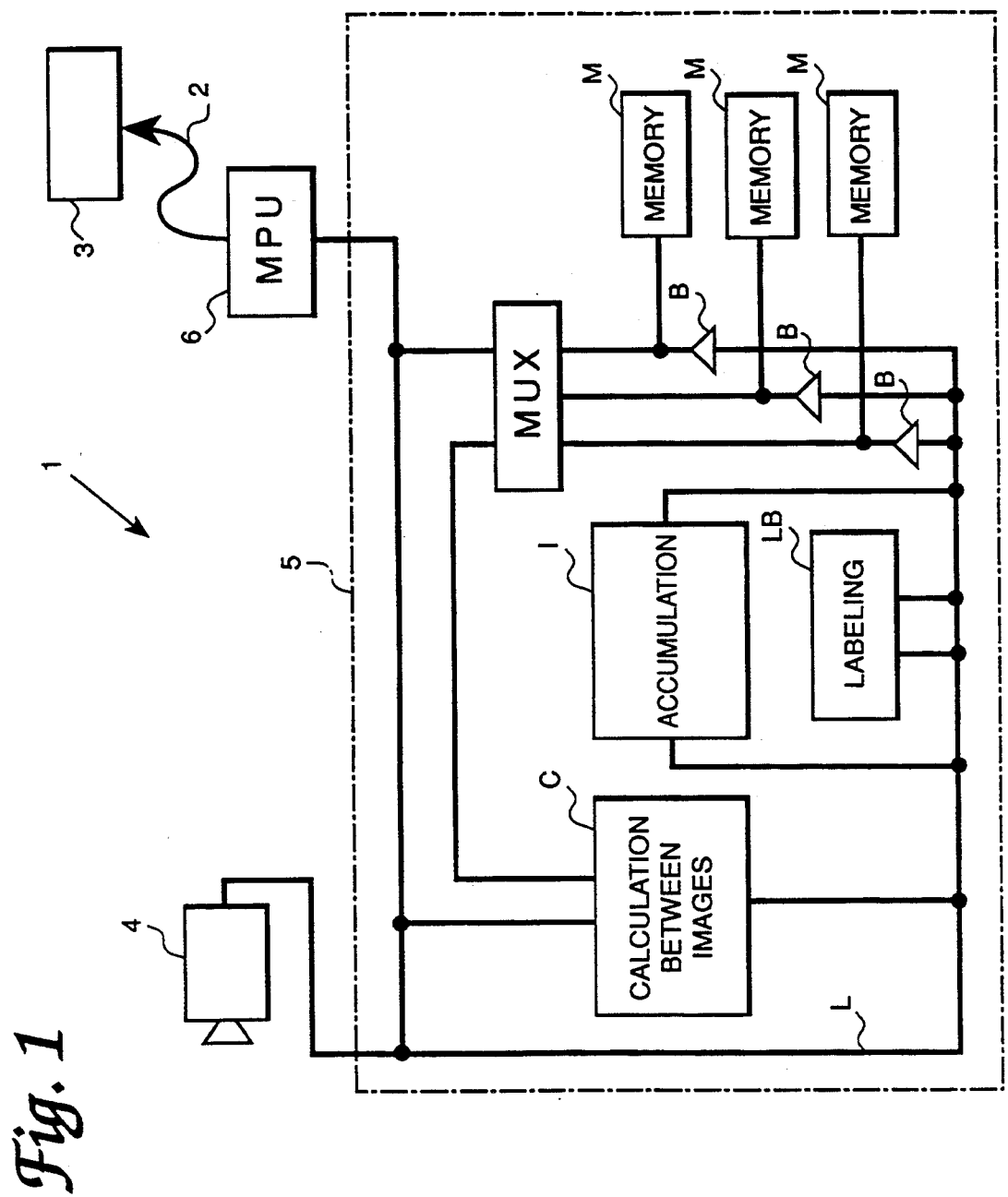
FIG. 1 shows a block diagram of an embodiment of the moving object tracking system of the present invention.

FIG. 1 shows a block diagram of an apparatus for carrying out the moving object tracking method of the present invention. Moving object tracking system 1 comprises central computer 3, communication line 2, camera 4, image processing means 5 and MPU 6.

Image processing means 5 comprises memory M which has a plural number of planes and to which camera 4 is connected through line L and buffers B. An image from camera 4 is input to one of the planes of memory M through one of the buffers B. Each memory is connected to a device for calculating the difference between images C through multiplexer MUX, whose output is connected to memory M through the same line L which is connected with camera 4. Any 2 images can be selectively input to the device for calculating the difference between images C from memory M. One output of multiplexer MUX is connected to the MPU and another is connected to the same line L which is connected with camera 4. Accumulation means I and labeling means LB are connected to line L. They perform accumulation and labeling, respectively, on the output of memory M.

Figure 2:
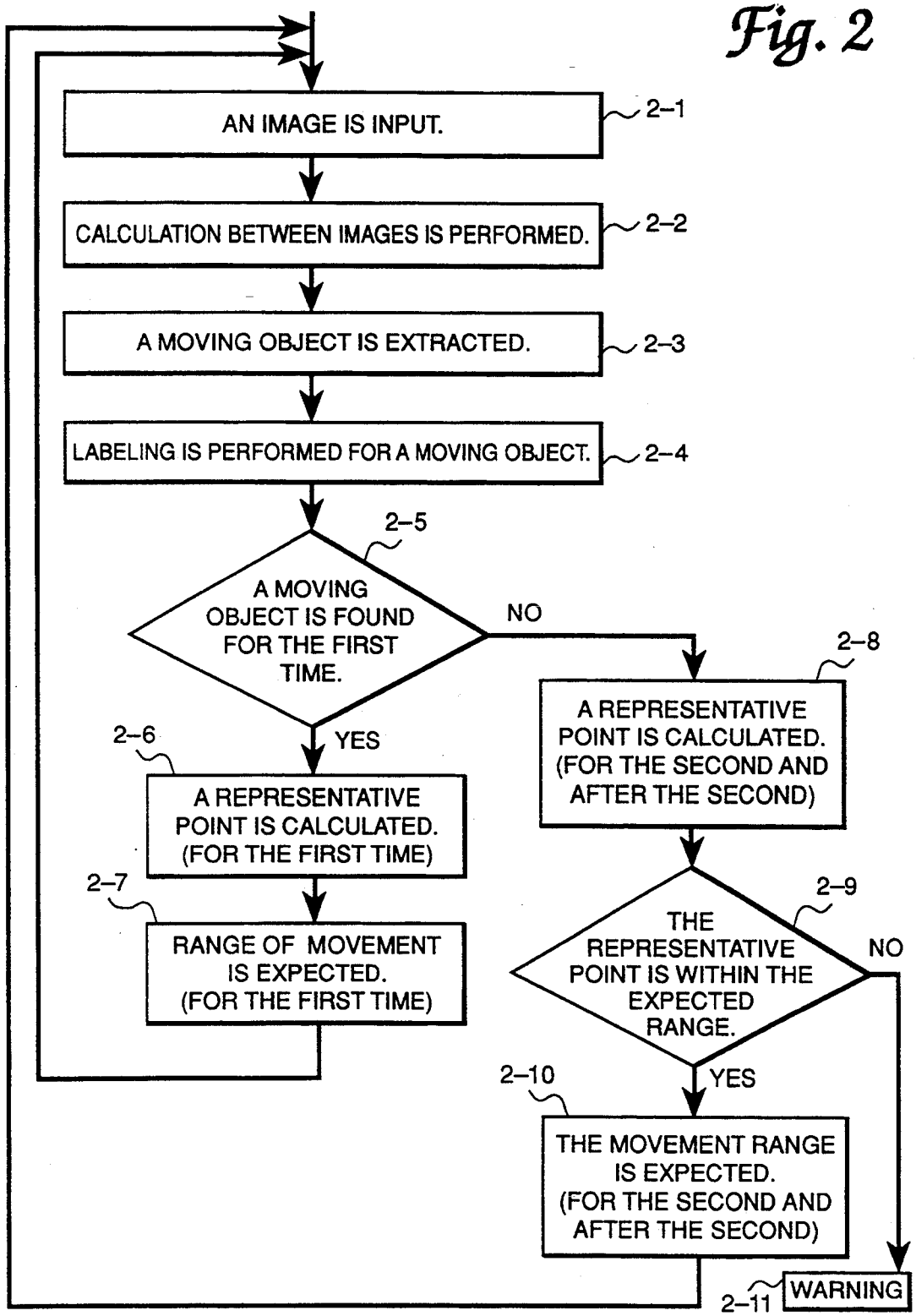
FIG. 2 shows a flowchart for explaining the processing of the present invention.

A moving object tracking system using the present invention with the above components and structure works as shown in the flowchart in FIG. 2.

In step 2-1, camera 4 inputs an image of predetermined area at predetermined intervals (for example, 1/30 sec.), and the image is stored sequentially in memory M. Two sequential images are input to the device for calculating the difference between images C and an EX-OR between them is performed in step 2—2. The difference between the images can then be extracted out and stored in step 2-3.

In step 2-4, each group in an image extracted in such a way is recognized as a moving object and is classified as a group by labeling means LB. The classified image is stored in a memory.

As shall be described below, the initial finding of a moving object is processed differently than the case where the object has already been found.

In step 2-5, it is determined whether the moving object had been found before. If so, the representative point is calculated in step 2-6. The representative point may be the object's center of gravity, its center of Feret's diameter, or the coordinates of Feret's diameter of a predetermined position (e.g., upper left).

The representative points are calculated in accumulation means I. The center of gravity can be calculated from the primary moment and an area, and the coordinates of Feret's diameter can be calculated by repeating the operations of MIN and MAX for the coordinates of pixels in each group. When the first representative point is calculated, the expected range of movement for the object is calculated in step 2-7. The expected range is determined in the MPU and is recorded in memory M.

Figure 3:
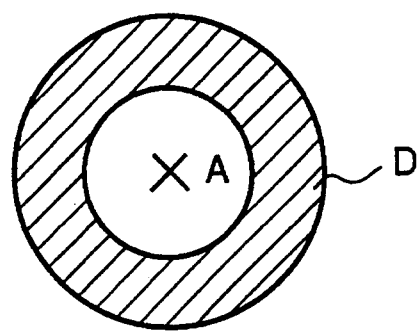
FIG. 3 shows an expected range of movement for an object that has been initially found.

FIG. 3 conceptually shows an expected range of movement. When the first representative point is located at the cross hatch labeled A, the expected range is the doughnut-shaped area D centered at A. At the second extraction of a representative point, if this second representative point corresponds to the same object as the initial representative point, it is expected that it will be in the doughnut-shaped area D. When a plural number of representative points exist in the area, one of them is adopted or the mean coordinate of them is adopted.

After an object is first found and the above processing is completed, the processing from step 2-1 to 2-4 is repeated. This time it will be determined in step 2-5 that a moving object has been found, and the representative point is extracted in step 2-8 for the object that was extracted in step 2-3. It is judged in step 2-9 whether the object processed in step 2-8 is the same one as the object previously found. That is, it is determined whether the representative point exists within the previous expected range of movement.

The judgment is performed as follows. Based on a representative point in the expected range in the image (shown as D in FIG. 3), a search is made to determine if an isolated point exists. An OR operation is performed between the image including the representative point and the image of the expected range, and it is judged whether an isolated point is generated. An isolated point is a point existing outside of an expected range. When an isolated point is generated, an indicative brightness is output.

When an isolated point is generated outside of the expected range D but on the same side of the expected range as was the last representative point of the object, this means that the moving object has come to a standstill, that is, decelerated. When an isolated point for an object is generated outside of the expected range D and on a different side than the last representative point, this means that the moving object has moved faster than the predetermined speed, that is accelerated. The output of the means for calculation between images C is input to the MPU. The MPU will cause some indication to be made when there is unexpected movement.

FIG. 3 shows the expected range of movement for the second extraction. The expected range of movement for the third and following extractions is shown as the fan-shaped area E in FIG. 4. The area shown in FIG. 4 is defined by the previous representative point A and the new representative point B.

Figure 4:
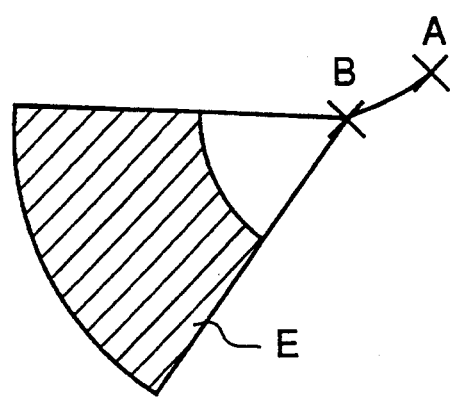
FIG. 4 conceptually shows an expected range of movement of an object that has been tracked over multiple images.

When a representative point exists outside of the expected range E of FIG. 4 any of the following may have occurred: i) the moving object came to a standstill, that is, decelerated, ii) the moving object moved faster than the predetermined speed, that is, accelerated, or iii) the moving object did not move in the predetermined direction, that is, accelerated. When it is determined in step 2-9 that one of these three has occurred, the warning is given in step 2-11. The next expected range is then calculated.

As mentioned above, it is possible to determine whether a moving object has come to a standstill and whether the moving object is moving with regular movement by tracking the object itself without registering the background image.

What is claimed is:

1. A method for determining whether a moving object is accelerating or decelerating comprising the steps of:
   i) sequentially inputting images of a predetermined area,
   ii) extracting a moving object from said images based on the differences in said images,
   iii) for each said image, calculating a representative point of each moving object and the expected range of the representative point for that object in a subsequent image,
   iv) for each said moving object, determining that said moving object is accelerating or decelerating when the location of the representative point for the object is outside of the expected range in said subsequent image.

2. The method of claim 1, wherein the representative point is a center of gravity of that object.

3. The method of claim 1, wherein the representative point is a center of Feret's diameters of that object.

4. The method of claim 1, wherein an object that is found outside of said expected range does not generate any new representative point.

* * * * *

UNITED STATES PATENT AND TRADEMARK OFFICE
CERTIFICATE OF CORRECTION

PATENT NO. : 5,379,236
DATED : January 3, 1995
INVENTOR(S) : YAMAMOTO, Makoto

It is certified that error appears in the above-identified patent and that said Letters Patent is hereby corrected as shown below:

ON THE COVER PAGE:
Reads:   [73]   Assignee:   Yozan Inc., Tokyo, Japan

Should Read: [73]   Assignee:   Yozan Inc., Tokyo, Japan and Sharp Kabushiki Kaisha, Osaka, Japan Signed and Sealed this First Day of August, 1995

*Attest:*

BRUCE LEHMAN

*Attesting Officer*     *Commissioner of Patents and Trademarks*